US012647476B2

(12) United States Patent
Agarwal et al.

(10) Patent No.: US 12,647,476 B2
(45) Date of Patent: Jun. 2, 2026

(54) WORKLOAD ELASTICITY

(71) Applicant: MICROSOFT TECHNOLOGY LICENSING, LLC, Redmond, WA (US)

(72) Inventors: Sharad Agarwal, Seattle, WA (US); Sanjeev Mehrotra, Kirkkland, WA (US); Ganesh Ananthanarayanan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 106 days.

(21) Appl. No.: 18/812,934

(22) Filed: Aug. 22, 2024

(65) Prior Publication Data

US 2026/0059015 A1     Feb. 26, 2026

(51) Int. Cl.
H04L 67/1008        (2022.01)
H04L 47/83          (2022.01)

(52) U.S. Cl.
CPC .......... H04L 67/1008 (2013.01); H04L 47/83 (2022.05)

(58) Field of Classification Search
None
See application file for complete search history.

(56) References Cited

U.S. PATENT DOCUMENTS

| | | | | |
|---|---|---|---|---|
| 11,477,275 | B1 * | 10/2022 | Mehrotra ............. | G06F 11/2038 |
| 2015/0296000 | A1 * | 10/2015 | Chandramouli .. | G06F 16/24568 |
| | | | | 709/224 |
| 2020/0019841 | A1 * | 1/2020 | Shaabana ............. | G06N 3/0442 |
| 2020/0336322 | A1 * | 10/2020 | Asanghanwa .......... | H04L 9/085 |
| 2020/0351274 | A1 * | 11/2020 | Damour ................ | H04L 63/105 |
| 2020/0379805 | A1 * | 12/2020 | Porter ................... | G06F 9/5072 |
| 2021/0173719 | A1 | 6/2021 | Chester et al. | |
| 2021/0243190 | A1 * | 8/2021 | Bargury ............... | G06F 21/604 |
| 2022/0201066 | A1 * | 6/2022 | Cuomo, Jr. ............ | H04L 43/16 |
| 2022/0353201 | A1 | 11/2022 | Navali | |
| 2022/0400085 | A1 * | 12/2022 | Ananthanarayanan ...................... | |
| | | | | G06F 9/505 |
| 2023/0076488 | A1 * | 3/2023 | Goiri Presa ......... | G06F 11/3442 |
| 2023/0350717 | A1 * | 11/2023 | Neate ................... | G06F 9/5027 |

OTHER PUBLICATIONS

Extended European Search Report Received for PCT Application No. 25195320.4, Dec. 17, 2025, 11 Pages.

* cited by examiner

*Primary Examiner* — June Sison
(74) *Attorney, Agent, or Firm* — Han Gim; Newport IP, LLC

(57) ABSTRACT

Computing resources are managed in a computing environment comprising a computing service provider and an edge computing network. The edge computing network comprises computing and storage devices configured to extend computing resources of the computing service provider to remote users of the computing service provider. The edge computing network collects capacity and usage data for computing and network resources at the edge computing network. A predictive function is applied to the data to determine a predicted demand on the computing and network resources at a future time interval. Based on the predicted demand, a distribution of workloads is determined.

20 Claims, 8 Drawing Sheets

800

WORKLOAD ELASTICITY

BACKGROUND

A data center houses computer systems and various networking, storage, and other related components. Data centers may, for example, be used by service providers to provide computing services to businesses and individuals as a remote computing service or provide "software as a service" (e.g., cloud computing). Service providers may also utilize edge sites that may include a geographically distributed group of servers and other devices that work together to provide efficient delivery of content to end-users of data center services, with the goal being to provide services with high availability and improved latencies.

It is with respect to these considerations and others that the disclosure made herein is presented.

SUMMARY

In various embodiments, users of a computing service such as a cloud computing service may be provided use of such services via computing and storage resources of the computing service at a remote location ("edge site"). The users may continue to benefit from the computing services, while aspects of the services are incorporated into the edge sites. Edge sites enable a data center to extend cloud services to local deployments using a distributed architecture that enables federated options for local and remote data and control management. It is desirable to provide the highest level of computing availability at an edge site while at the same time providing performance and minimizing cost.

When implementing edge computing, the network might be architected to scale the instances of network functions in order to meet user demands. In such configurations, systems that manage the network functions have a choice as to when and how many instances to run. One issue when managing such a network is how a management/orchestration system determines how to scale network functions among the various edge sites of the service pipeline. This decision may depend on a plurality of factors, for example the required performance that is needed to meet service level agreements between the provider and the customer. The management/orchestration system must consider latency and computation budgets for the services and the available resources. Monitoring user loads at the various levels of the service pipeline is another factor that influences such decisions. The present disclosure describes techniques for predicting and optimizing the placement of network function instances across the edge hierarchies to optimize one or more factors such as cost and quality of service.

The described techniques can allow for incorporation of a user's resources on-premises while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
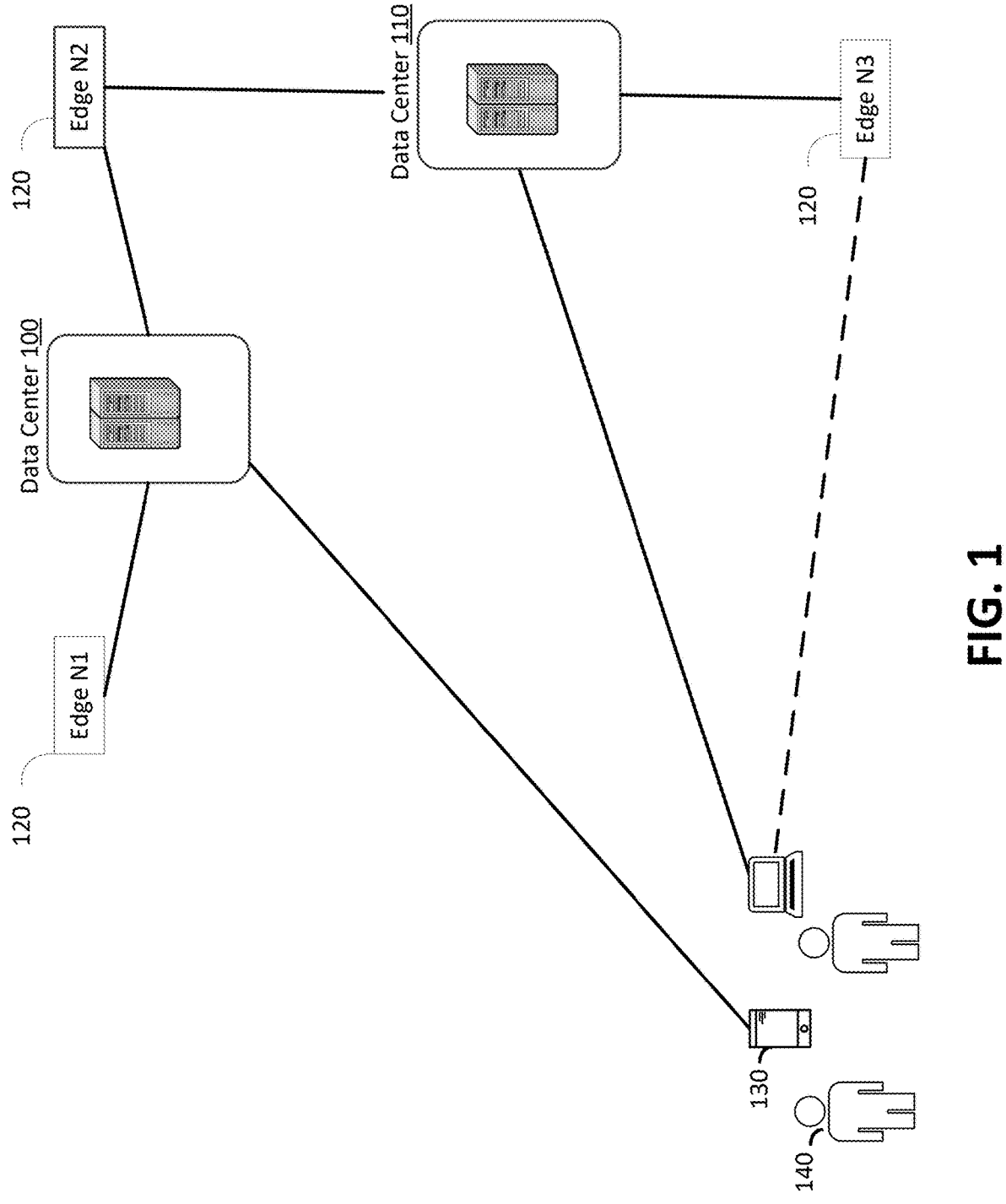
FIG. 1 is a diagram illustrating an example architecture in accordance with the present disclosure.

In some computing environments that provide virtualized computing and storage services, various computing and network services may be configured to enable the service provider to deploy their footprints closer to the user's premises, thereby extending the reach of the computing and network services closer to the user premises. For example, an enterprise that provides network carrier services may want computing services located closer to their networks or their customers, or a manufacturer may want to deploy computing resources closer to their facilities. Users of virtualized computing resources may benefit in many ways by deploying resources such as virtual machines on resources that are located closer to their premises. Additionally, localization of computing and storage devices may enable some users to more effectively meet data residency, compliance, latency, and other requirements, while continuing to benefit from many of the advantages of utilizing remote and/or virtualized computing services, such as scalability and flexibility. As used herein, "resources" may refer to various types of multi-dimensional resources including CPU, GPU, memory, etc.

Efficient management of the end-to-end services by the service provider can enable an experience that is seamless and consistent when using edge sites. The integration of local and remote resources with a comprehensive remote resource management approach can allow for efficient utilization of compute capacity by the service provider and maximize the capabilities of the edge site, and can also reduce overhead for the user, who will not need to perform complex management tasks or suffer from inefficient response to user demands. The effective distribution of the network functions can be determined based on the implications for various performance and security implications such as latency and quality of service.

The present disclosure enables the efficient distribution and instantiation of services such as network functions to computing resources located at various hierarchies between the user premises and the cloud to efficiently deliver services and allow the remote service provider to implement a comprehensive solution to the user's needs in an optimized manner. The computing resources may be provided by the user or provided by the remote service provider. Various embodiments disclosed herein include the integrated and federated management of the network functions in view of the entire end-to-end capability.

In many cases a network will have a hierarchy of sites, such as an on-premise edge, a network edge, and the cloud. In other examples, there may be more or less edge sites. Each edge site can be configured with some number of compute racks, typically based on estimates of compute capacity that may be needed according to a model. However, if the model is incorrect or usage greatly exceeds expectations, a number of issues may arise, such as degraded service or denial of services to some users.

The disclosed embodiments enable service providers to predictively burst or deflate the compute capacity between locations, for example from an edge site that has less users and thus has available capacity, or a nearby cloud region with reserve capacity. "Predictively" refers to predicting a burst (and conversely a downturn) of usage before the burst (or downturn) occurs. Such dynamic burst capability enables a variety of use cases. For example, business continuity, disaster recovery (BCDR) scenarios, including loss of an edge data location due to a natural disaster, can result in sudden surges of usage by emergency response personnel as well as users who are experiencing the disaster. Another scenario is a rolling upgrade of software, which can cause disruptions of availability or degraded capacity. As another example, smaller scale operators may have insufficient physical locations for edge sites and thus rely on the cloud for reserve capacity—such operators may occasionally experience a burst of usage for which they are not provisioned to handle.

The Session Management Function (SMF) is an example of one of the many network functions that are required to provide a complete set of services in a telecommunications context. If the usage of the SMF at a given location suddenly increases and exceeds the capacity of the number of instances that are running at the location, then the data center may respond by instantiating additional instances. However, during the time required for the instance to be allocated and begin executing, some number of new users as well as existing users can be impacted.

The present disclosure provides a way to predict when the usage of such network functions will increase so that new instances can be initiated and begin running when the capacity is needed. Similarly, when loads have decreased, the number of running instances can be decreased, thus allowing for unneeded capacity to be utilized elsewhere. Additionally, the shedding of capacity can be performed in a measured manner such that existing loads need not be migrated and such that the existing loads can be allowed to gracefully shed.

While such predictions are performed for cases such as website capacity, the prediction of loads for telecommunications networks can be complex. Web workloads typically involve short-lived connections. However, connections in a telecommunications context tend to have longer lived connections. Additionally, telecommunications networks often employ service chaining where for a given user session, multiple instances of different network functions are chained together to provide end to end services, such as the chaining of the SMF, AMF, and UPF. Service chaining thus makes the prediction and allocation problem non-trivial to solve. For example, if there are a plurality of requests, the impact for a given task may be different than the impact on a subsequent task 2. Thus one task may be scaled out differently than another task. Additionally, the dependencies between tasks and the associated state replication introduces additional complexities, which makes unique the solution provided by the disclosed embodiments. For a given service chain, the individual service chain functions can be individually model and the relationships between the individual service chain functions can be modeled as well.

In any large deployment of a 5G network, there will typically be multiple instances of each NF, and each user needs to be sent to one of these instances. The decision of which instance to send each user to may be determined by a network repository function (NRF). The NRF, however, does not perform intelligent geographic routing of incoming user requests based on the load at each location. The present disclosure provides a way to intelligently route incoming user requests based on characteristics such as connectivity, compute capacity, bandwidth, and availability between edge sites and the data center. The placement decision can further consider factors such as a prediction as to which NFs will burst at each location.

Various functions and models for prediction and forecasting can be used in the disclosed embodiments. Some models for forecasting can include a trend component for modeling the basic trend of a metric over time as well as aa periodic or seasonal component that models predictable changes based on the natural period of the metric (e.g., daily startup). Some models may include a noise component that accounts for expected variations in the data. Some models may also include an event-based component that represents effects due to the impact of an asynchronous or anomalous event. The event-based component can be used for various types of sudden events such as a customer reconfiguration.

Additionally, the disclosure further considers placement decisions in a multi-channel scenario. In an embodiment, a multi-dimensional approach may be used to map multiple channels across multiple locations, where each combination can be analyzed for potential usage spikes. This enables efficient allocation of resources in a multi-tenant scenario.

More generally, the disclosed embodiments can be implemented for a plurality of scenarios with service chaining, such as AI workloads. Such workloads can include a containerized workload (e.g., on Kubernetes) running on the user's premises using edge and cloud computing resources. The disclosed embodiments enable efficient and seamless operation of public and hybrid clouds.

Some embodiments provide the ability to gracefully implement degraded service. For example, if there is no nearby data center region or edge site with available capacity and a high load level is predicted, then in conventional systems, various sets of users would not be able to connect or would experience poor performance. However, if a high load level is predicted and there is no nearby data center region or edge site with available capacity, embodiments of the present disclosure provide gracefully degraded performance based on one or more criteria and one or more priorities. For example, first responders may continue to be provided full service, while other tiers of users may experience delays and changes to service availability (e.g., SMS only).

The ability to implement gracefully degraded service allows not only for compute capacity to be available for other workloads, but also enables reduced power consumption. In an embodiment, the system can wait for the existing requests and workloads to naturally terminate rather than moving existing requests or workloads to another location. In an example, if location B is to be drained, then during a period of time new requests are only sent to only location A. Once location B completes its requests. location B can be terminated. By knowing in advance that location B can be terminated, then the time that location B waits to finish requests can be minimized.

While the examples illustrate a scenario with an edge site and a data center, it should be understood that the same principles can be applied to groupings of edge sites. data center regions, or combinations thereof. In some embodiments, the data centers of different service providers can interoperate to provide burst capacity, similar to a roaming scenario.

While some automatic scaling services can be implemented in some conventional systems such as horizontal pod autoscaling in Kubernetes, the capabilities are limited in that while a metric (e.g., CPU usage or requests per second) can be specified, such scaling services merely spin up more pods when a target is reached. However, the scope of such scaling services is limited to specific contexts such as a single cluster of a deployment, and there is no way to extend additional resources as in the present disclosure. In some embodiments, prediction of resource usage can be implemented across multiple clusters. The instantiation of containers and virtual machines can take some time and thus the ability to predict usage spikes and instantiating the VMs and containers before they are needed avoids the need for delays in spinning up the additional resources and making them available to users.

Additionally, since there is typically a minimum time that it takes to spin up either a VM or a container, the disclosed system determines, based on a threshold, a point at which a predicted usage spike is not long enough to justify spinning up additional resources. In an embodiment, the prediction can be determined for services as well as network functions.

The disclosed embodiments can also provide for the selective distribution of users to selected pods that are providing a requested microservice, based on prediction of workloads. Requesting data flows are typically identified, for example, based on their 5-tuple, and load balancers typically assign data flows based on a random distribution or some other distribution scheme. The disclosed embodiments allow for intelligent distribution of new data flows using various metrics such as the location of the user and knowledge of edge sites locations and their available capacities. While conventional systems distribute workloads using relatively simple metrics such as the number of HTTP requests per second and the CPU load, in the case of complex networks such as 5G networks, where each user request, or even each intermediate request, the service chaining can be different, the use of such simple techniques will not yield effective resource management. The use of simple metrics such as requests per second would be insufficient to enable selective prediction and distribution as in the disclosed embodiments. For example, a request for a data channel to the UPF can require a lower bandwidth while other requests might require much higher bandwidth. Given the many different types and contexts of NFs, much detailed metrics can be analyzed to provide a more detailed as compared to conventional methods.

In some embodiments, state replication need not be addressed as the disclosed principles are implemented for new sessions, and thus existing user sessions need not be migrated. Implementation of new user sessions can be efficiently implemented with relatively straightforward configurations and policies, thus making the present disclosure cost effective to implement.

Some functions with large amounts of state data such as the location management function (LMF) can require additional initialization time. The disclosed embodiments can predictively determine when new instances should be started in order to meet the predicted demands. For efficiency the state data can be replicated as needed or multiple copies of the state data can be synchronized at the edge sites and data centers.

In some embodiments, multiple stages of a prediction can be implemented with multiple thresholds. Instances can be created based on a first threshold for a given prediction as long as resources are available, but if the predicted usage event does not take place, the newly created instances can be torn down. If there is a potential for resource contention, then instances can only be created based on a second threshold.

In one embodiment, an orchestrator function may be implemented that intelligently places tasks on various edge networks and data centers based on capacities, bandwidth, policies, and other inputs. In an embodiment, a local edge manager may execute at each edge network. The local edge manager may communicate with the orchestrator function to locally manage containers and other components running at the edge. The local edge manager and orchestrator function may collectively monitor and manage available resources such as uplink and downlink capacity and computing capacity. The local edge manager may send information to the orchestrator function that indicates the current workload demands and availabilities at the edge. The orchestrator may analyze the information and send instructions to the local edge manager as to what processes should be run at the edge and if any changes are needed.

Within the confines of the instructions provided by the orchestrator, the local edge manager may locally manage workloads and other configurations at the edge to efficiently utilize the available resources. The capacities at the edge network may continuously change, for example when new workloads are brought into the edge (e.g., from local users at the edge network), and therefore the local compute capacity may change at any time. The local edge manager may provide the updated capacity information to the orchestrator which may generate updated instructions for redistributing workloads at the edge sites.

One aspect of the present disclosure is the balance between decisions made by the local edge manager and those made by the orchestrator function. In some embodiments, workload decisions made by the orchestrator function and workload decisions that are allowed to be made by the local edge manager may be determined based on a threshold.

In some embodiments, the orchestrator function may determine workload distribution for a multi-level hierarchy based on prediction function. In many cases, a two-level hierarchy may be implemented, where an orchestrator (first hierarchy) makes decisions and delegates workloads to local edge managers (second hierarchy).

The prediction function may allow for consideration of the various costs for performing a workload locally vs performing the workload at another site. The prediction function may also consider the cost of sending or migrating the workload and state to another site for remote handling. The cost of sending the workload to another site may be complementary to the initial decision on distribution to place the workloads. Thus, the prediction may consider a plurality of factors to determine an optimal and dynamic distribution of workloads between the levels of hierarchy based on one or more constraints. Other workload distribution schemes such as load balancing do not consider the specific capabilities of a computing resource. Furthermore, other workload distribution schemes may not preserve the state of a workload in the distribution decision. The constraints for the prediction function may include policies, service level agreements, customer inputs, and the like. The prediction function may be implemented as a machine learning model and may further consider a cost function that implements techniques such as a 0-1 loss function or a quadratic loss function.

In an embodiment, the inputs to the workload optimization may include the following inputs:

Pipeline of modules for a service or network function

CPU, GPU (and other types of accelerators for machine learning operations such as FPGAs, etc.), memory and network requirements of each module in the pipeline Resource capacities of each edge site or data center In an embodiment, the workload distribution decisions may consider:

Assign instances of network functions to an edge site or data center by matching the demands to capacities Adapt to changing resource demands by migrating data flows An objective function that combines:

Maximize a parameter for the network function or service (e.g., accuracy of output)

Minimize resource usage at the edge sites or data centers

Additional parameters for determining workload distribution can include network statistics including round trip time (RTT), bandwidth, loss rates, jitter, etc.

In an embodiment, the orchestrator function can determine state transfer requirements pertaining to a workload, runtime duration of the workload, and number of CPU cycles required to execute the workload. This data can be utilized by the orchestrator function to determine an estimated cost for the workload with respect to executing the workload at the edge site versus executing the workload at another edge site the cloud. In an example, the orchestrator function may transmit a data packet containing an instruction to a local edge manager that indicates that a given workload is to be offloaded to the cloud for execution thereon. In some embodiments, the local edge manager can be configured to compute a cost function for each workload.

The local edge manager can be configured to determine which state information pertaining to the workload should be sent to another location to allow the receiving edge site or data center to execute the workload. Appropriate state information can be transmitted to the orchestrator function. The orchestrator function can receive this state information and can execute the workload using the state information provided by the local edge manager. The local edge manager may continue to determine local capacity information and may send updates to the orchestrator function. This data may be used to update predictions for executing workloads. If the orchestrator function updates a prediction, updated instructions can be transmitted from the orchestrator function to the local edge manager. For example, degradation of connectively between an edge site and the cloud can cause changes to the workload distribution.

In an embodiment, in order to determine a prediction and cost for a given network function, a model of the execution behavior of the network function in the form of an annotated graph may be used. A linear program solver may be used to distribute a substantially optimal distribution strategy that optimizes cost based on one or more constraints. In an embodiment, an objective function is optimized for cost, latency, throughput, failure resilience, or other parameters. For example, given a criterion, workload distribution can be determined that results in the best minimum or maximum value of the objective function (depending on the criterion) in the prediction model.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples.

The present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

FIG. 1 illustrates one example where users of a data center in accordance with some embodiments. FIG. 1 illustrates data center 100 and 110 that are configured to provide computing resources to users 140 via user computers 130. The computing resources provided by data centers 100 and 110 may be cached or replicated at edge nodes 120. The computing resources provided by the data centers 100 and 110 and edge nodes 120 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein. It should be also appreciated that the network topology illustrated in FIG. 1 has been greatly simplified and that many more networks and networking devices may be utilized to interconnect the various computing systems disclosed herein. These network topologies and devices should be apparent to those skilled in the art.

FIG. 2A illustrates an example computing environment in which the embodiments described herein may be implemented. FIG. 2A illustrates a service provider 205 that is configured to provide computing resources 203 to users 206 at a user site. The user site may include edge sites 201 with computing resources that may access services provided by service provider 205 via a network 207. The computing resources provided by the service provider 205 may include various types of resources, such as computing resources, data storage resources, data communication resources, and the like. For example, computing resources may be available as virtual machines or containers. The virtual machines or containers may be configured to execute applications, including network functions. Data storage resources may include file storage devices, block storage devices, and the like. Networking resources may include virtual networking, software load balancer, and the like. The service provider may have various computing resources including servers, routers, and other devices that may provide remotely accessible computing and network resources using, for example, virtual machines. Other resources that may be provided include data storage resources. The service provider may also execute functions that manage and control allocation of network resources, such as a network manager.

Figure 2:
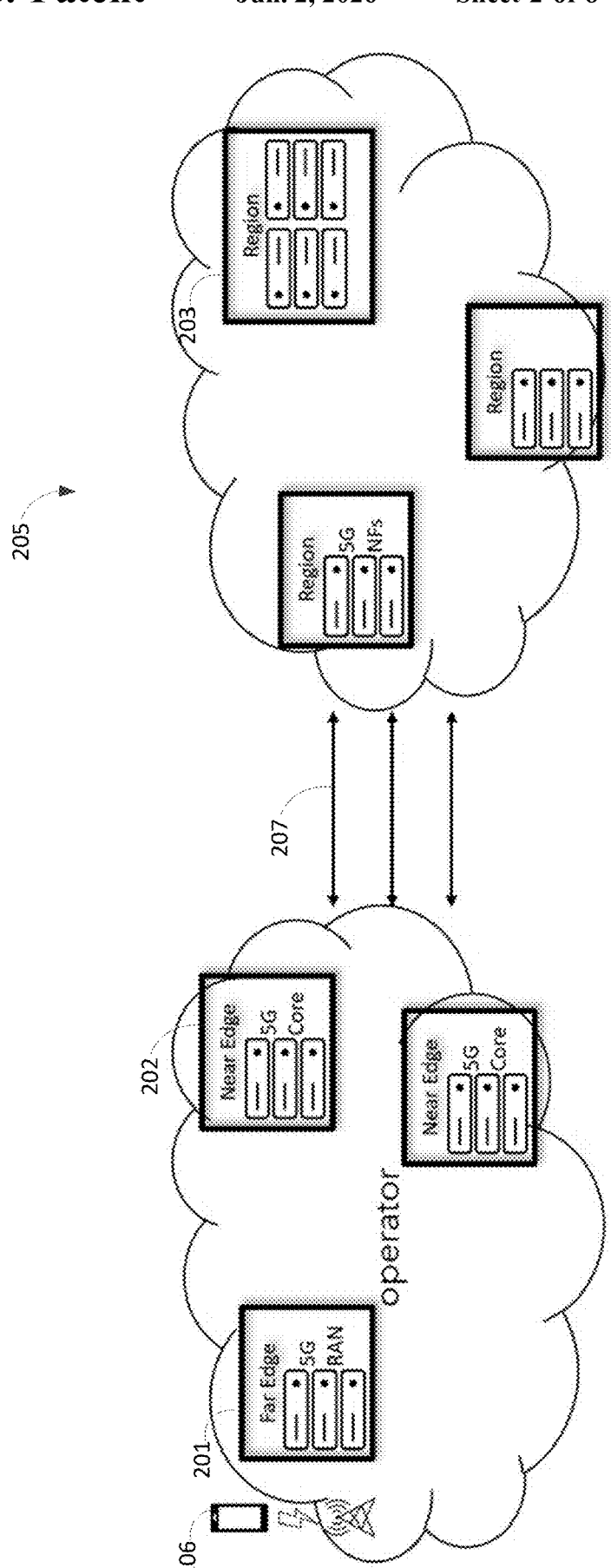
FIG. 2 is a diagram illustrating an example architecture in accordance with the present disclosure.

FIG. 2 illustrates that edge sites 201, 202 may be implemented to extend the physical reach of service provider 205 to provide localized computing resources to users 206 at the user site. The computing resources provided by the edge site 201, 202 may include some or all of the various types of resources provided by service provider 205. The resources at edge site 201, 202 may be under the control of service provider 205.

Figure 3:
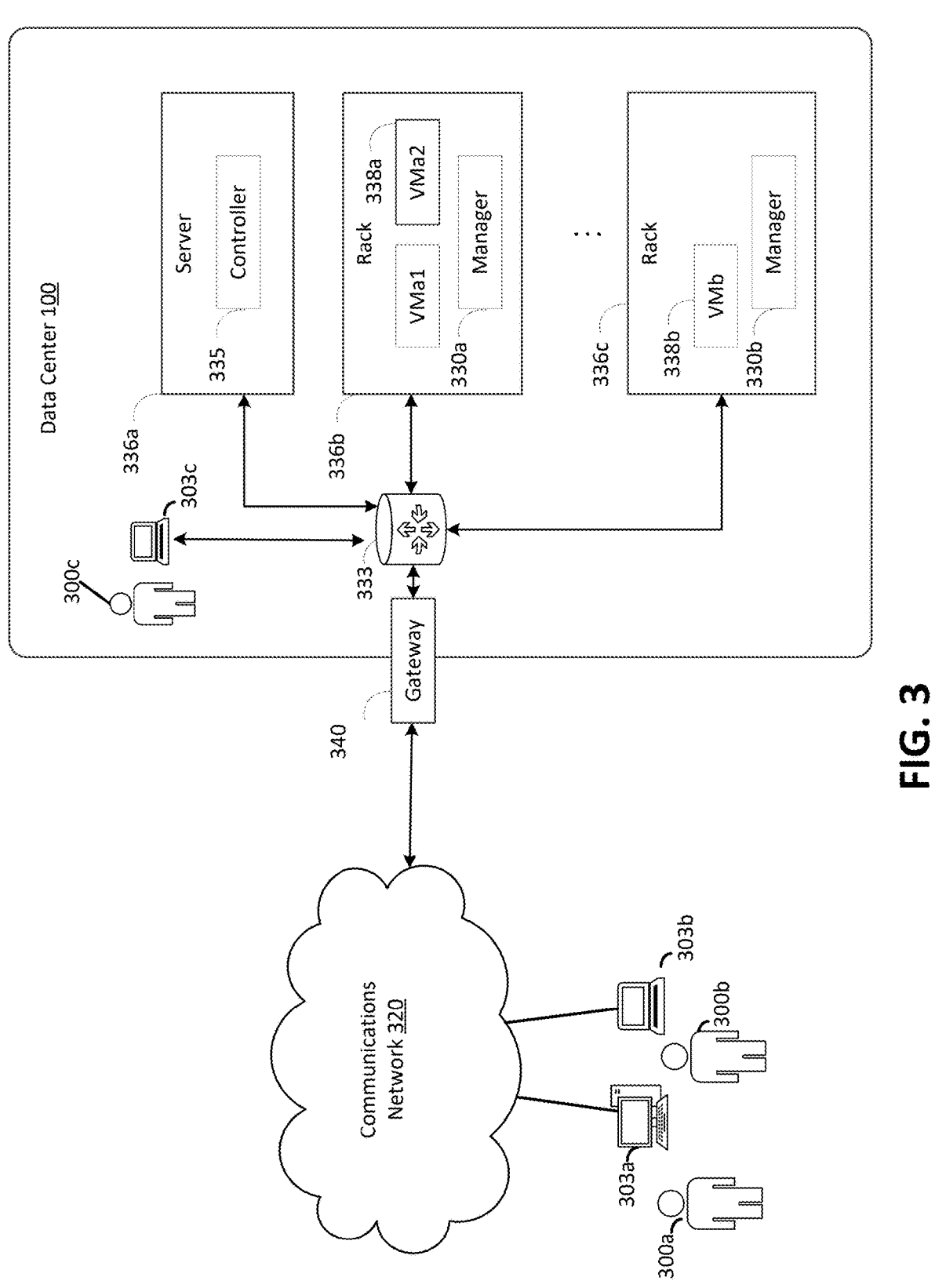
FIG. 3 is a diagram illustrating a data center in accordance with the present disclosure.

FIG. 3 illustrates an example computing environment in which the embodiments described herein may be implemented. FIG. 3 illustrates a data center 100 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 320. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

Referring to FIG. 3, communications network 320 may, for example, be a publicly accessible network of linked networks and may be operated by various entities, such as the Internet. In other embodiments, communications network 320 may be a private network, such as a corporate network that is wholly or partially inaccessible to the public.

Communications network 320 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 100. User computer 303a or 303b may connect directly to the Internet (e.g., via a cable modem). User computer 303c may be internal to the data center 100 and may connect directly to the resources in the data center 100 via internal networks. Although only three user computers 303a, 303b, and 303c are depicted, it should be appreciated that there may be multiple user computers.

Computers 303 may also be utilized to configure aspects of the computing resources provided by data center 100. For example, data center 100 may provide a Web interface through which aspects of its operation may be configured through the use of a Web browser application program executing on user computer 303. Alternatively, a stand-alone application program executing on user computer 303 may be used to access an application programming interface (API) exposed by data center 100 for performing the configuration operations.

Servers 336 may be configured to provide the computing resources described above. One or more of the servers 336 may be configured to execute a manager 330a or 330b (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 100 shown in FIG. 3, a network device 333 may be utilized to interconnect the servers 336a and 336b. Network device 333 may comprise one or more switches, routers, or other network devices. Network device 333 may also be connected to gateway 340, which is connected to communications network 320. Network device 333 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 100 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, tablets, smartphones, Internet appliances, and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
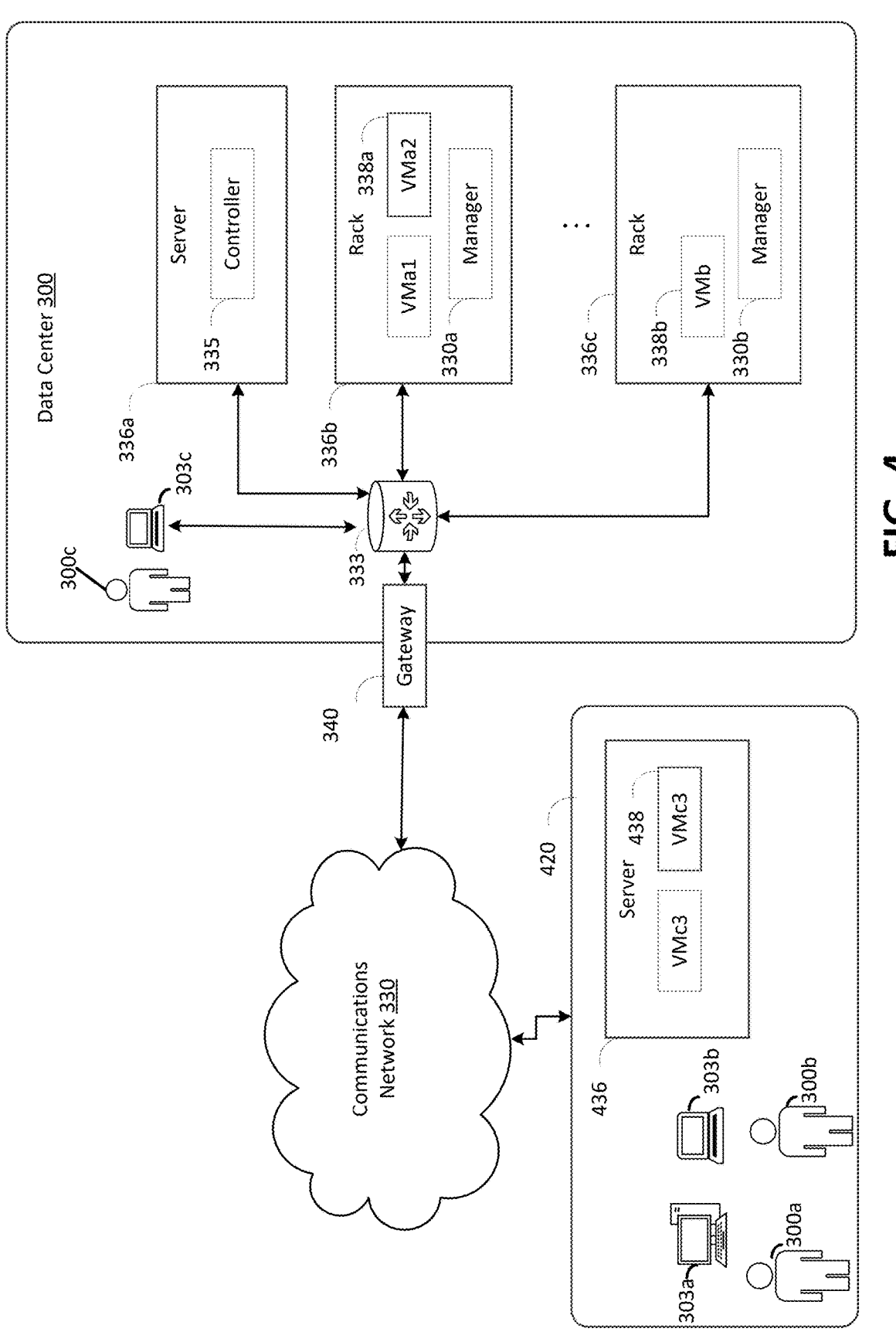
FIG. 4 is a diagram illustrating a data center and local resources in accordance with the present disclosure.

FIG. 4 illustrates an example computing environment illustrating integration of computing resources that include an edge site 420 that is geographically proximate to a facility local to users 300, in accordance with the present disclosure. In one embodiment, one or more servers 436 may be installed at the edge site 420. In an embodiment, servers 436 instantiate and run virtual machines 438.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 5:
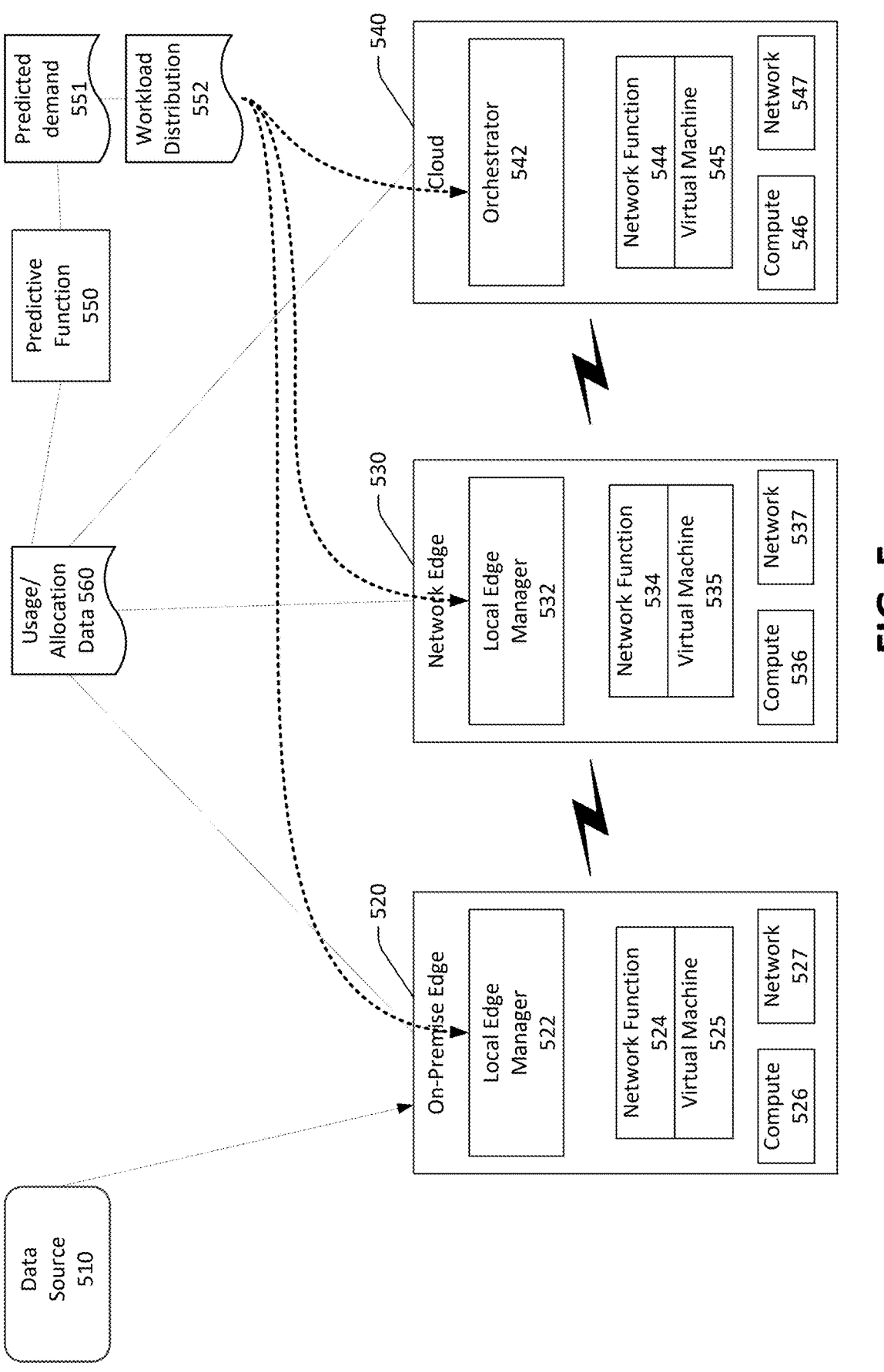
FIG. 5 is a diagram illustrating an architecture for managing resources in accordance with the present disclosure.

With reference to FIG. 5, illustrated is one example architecture for providing management of computing resources in accordance with the present disclosure. In an embodiment, the architecture may include an on-premise edge 520 that includes a local edge manager 522. The on-premise edge 520 may include resources such as compute resources 526 and network resources 527 that instantiate virtual machine 525 which may run network function 524. In an embodiment, the architecture may include a network edge 530 that includes a local edge manager 532. The network edge 530 may include resources such as compute resources 536 and network resources 537 that instantiate virtual machine 535 which may run network function 534. In an embodiment, the architecture may include a cloud node 540 that includes an orchestrator 542. The cloud node 540 may include resources such as compute resources 546 and network resources 547 that instantiate virtual machine 535 which may run network function 534. In various embodiments, there may be a plurality of on-premise edges 520, network edges 530, and cloud nodes 540. Data source 510 may provide data for processing by on-premise edge 520. Further tasks may be processed at network edge 530. Additional tasks may be processed at the cloud node 540. The orchestrator 542 may cooperate with local edge manager 532 and local edge manager 522 to distribute tasks of a network function or service chain.

In one example, a service chain may be configured to provide a network service. Instances of the various network functions of the service chain may be distributed at the on-premise edge 520, network edge 530, and cloud node 540.

In an example embodiment, edge computing networks 522, 530 collect data 560 indicative of network function allocations and capacity and usage of computing 526, 536 and network resources 527, 537 at the edge computing network 522, 530 during a selected time interval. Predictive function 550 is applied to the data to determine a predicted demand 551 on the computing and network resources at a future time interval. Based on the predicted demand 551, a distribution of workloads 552 is determined. In an embodiment, the predicted demand 551 is a time-based usage profile for the computing and network resources during the future time interval. The workloads pertain to functions implemented at the edge computing network, such as network function 524, 534. The distribution of workloads 552 is determined based on criteria for optimizing cost and priorities. Numbers of instances of functions are adjusted at the edge computing network 520, 530 based on the distribution of workloads 552.

Figure 6:
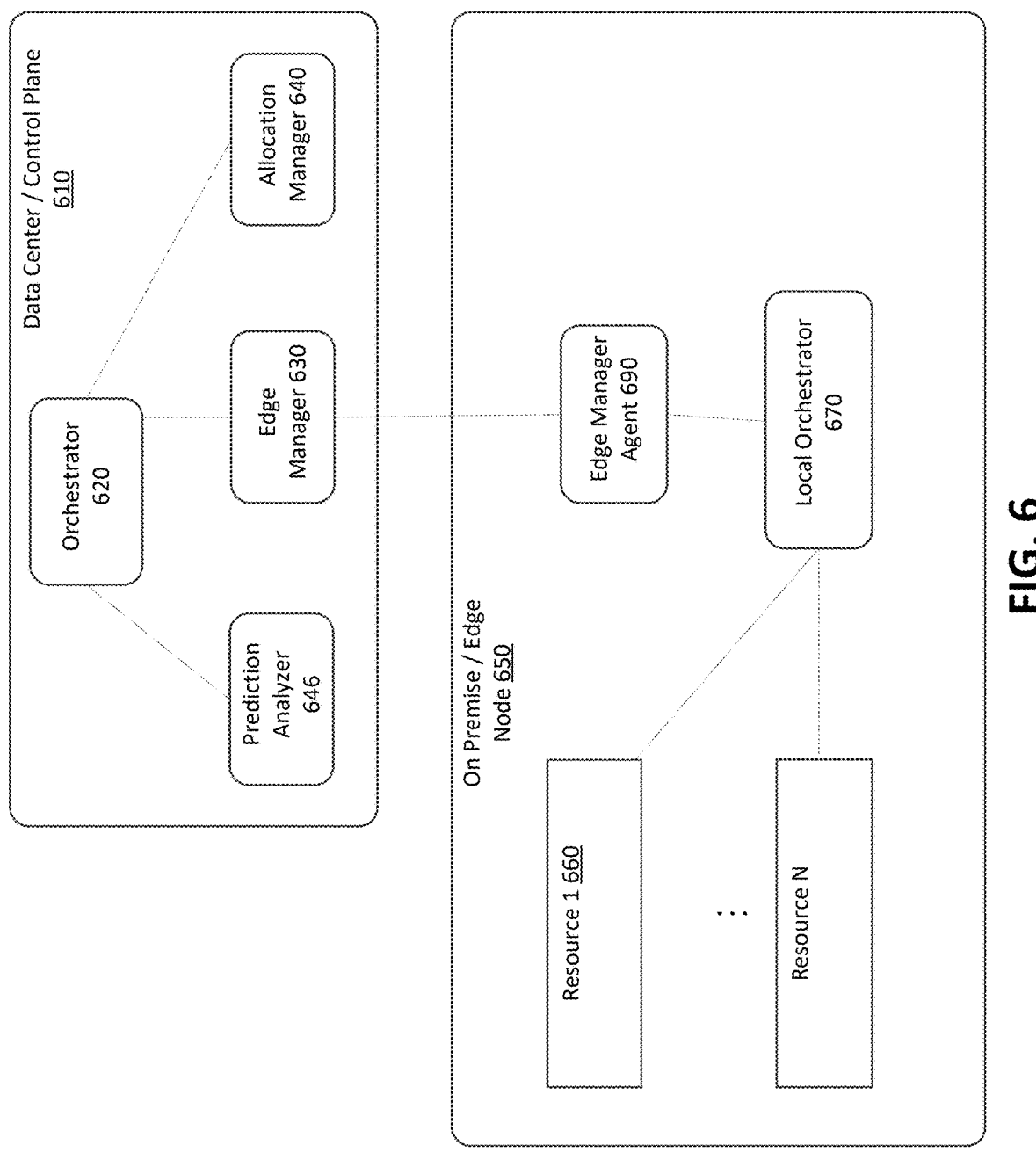
FIG. 6 is a diagram illustrating an architecture for managing resources in accordance with the present disclosure.

With reference to FIG. 6, illustrated is one example architecture for providing management of computing resources in accordance with the present disclosure. FIG. 6 adds further detail to the example architecture shown in FIG. 5. In an embodiment, the architecture may include an edge node 650 that may include one or more resources 660. The edge node 650 may include local edge manager agent 690, which may be a service running on the edge node 650 and configured to monitor local resources and capacities. The edge manager agent 690 may be configured to track workloads that are being processed at the edge node 650 and may monitor various metrics including availability, read and write latency, etc. The current status of all resources may be sent to orchestrator 620 for performing actions as needed.

Edge manager agent 690 may be executed as a service running on the edge node 650. Edge manager agent 690 may be configured to receive requests for operations from edge manager 630 at the data center 610. The edge manager agent 690 may perform the requested operations at the edge node 650. A local orchestrator 670 may distribute tasks among resources at the edge node 650.

The orchestrator 620 may be located in the data center/ control plane 610. The orchestrator 620 may be configured to receive information pertaining to resources in an edge site. The information may be used to determine whether a workload should be handled by the edge node 650. The information may be used to determine whether additional workloads should be handled at edge node 650.

Prediction analyzer 646 is configured to monitor data to determine predicted usage spikes. Allocation manager 640 may be configured to determine a suitable edge site for executing additional workloads (e.g., virtual machines, containers, etc.) to handle a predicted usage spike. The allocation manager 640 may further be configured to maintain a list of all nodes at an edge site, their capabilities, and what workloads are currently running on each server node. The capability list may be modified when new information is received from edge manager agent 690.

Figure 7:
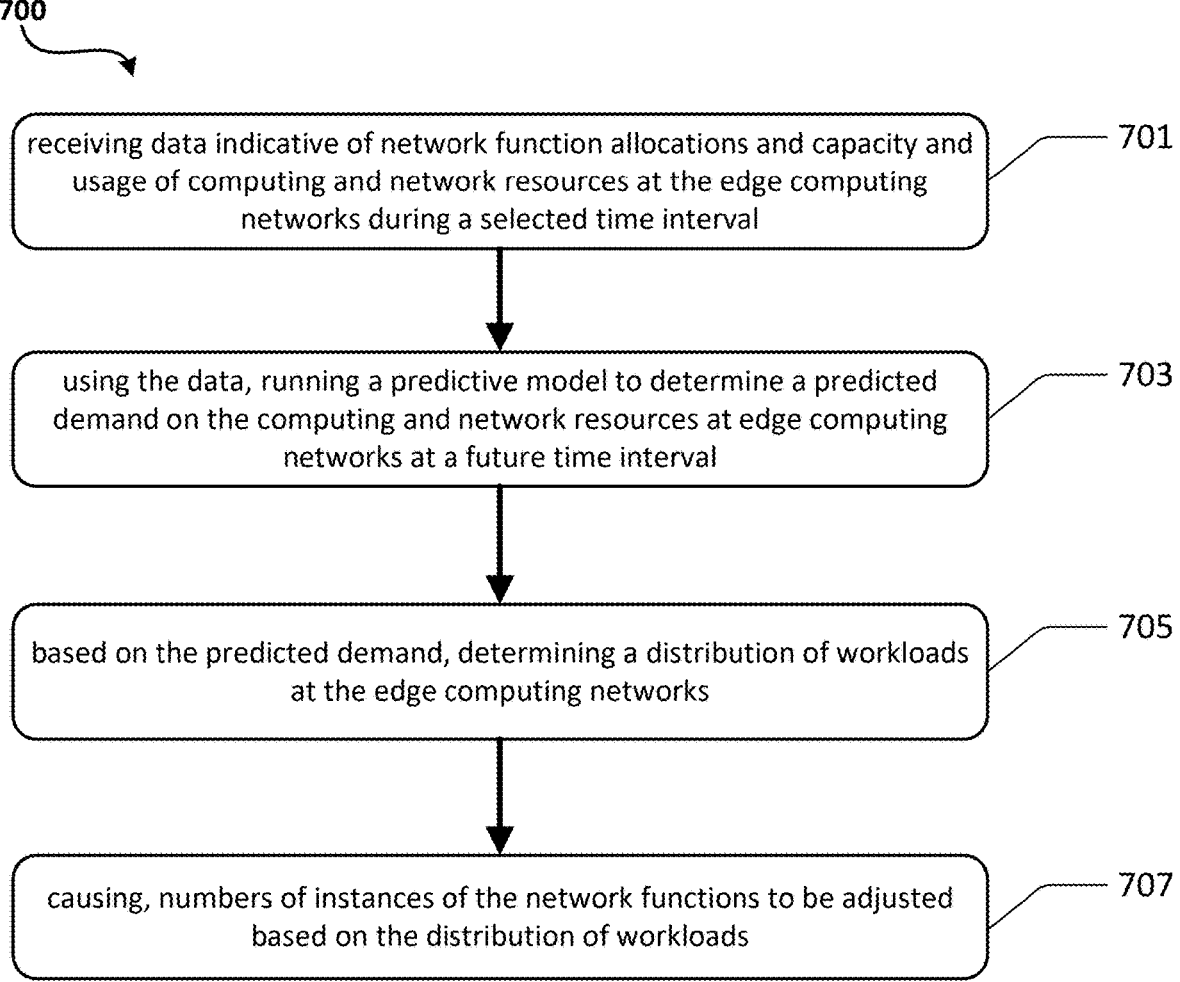
FIG. 7 is a flowchart depicting an example procedure for managing resources in accordance with the present disclosure.

Turning now to FIG. 7, illustrated is an example operational procedure for allocating workloads in accordance with the present disclosure. Such an operational procedure can be provided by one or more components illustrated in FIGS. 1 through 6. The operational procedure may be implemented in a computing environment comprising a computing service provider and a plurality of edge computing networks. The edge computing networks can comprise computing and storage devices configured to extend computing resources of the computing service provider to remote users of the computing service provider. The edge computing networks run network functions implementing communications services to the remote users.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 700 is described as running on a system, it can be appreciated that the routine

700 and other operations described herein can be executed on an individual computing device or several devices.

Referring to FIG. 7, operation 701 illustrates receiving, from the edge computing networks, data indicative of network function allocations and capacity and usage of computing and network resources at the edge computing networks during a selected time interval.

Operation 703 illustrates using the data, running, by an orchestrator at the computing service provider, a predictive model to determine a predicted demand on the computing and network resources at edge computing networks at a future time interval. In an embodiment, the predicted demand comprises a time-based usage profile for the computing and network resources at the edge computing networks during the future time interval.

Operation 705 illustrates based on the predicted demand, determining a distribution of workloads at the edge computing networks. In an embodiment, the workloads pertain to the network functions implemented at the edge computing networks. In an embodiment, the distribution of workloads is determined based on criteria for optimizing an objective function.

Operation 707 illustrates causing, at the edge computing networks prior to the future time interval, numbers of instances of the network functions to be adjusted based on the distribution of workloads.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 8:
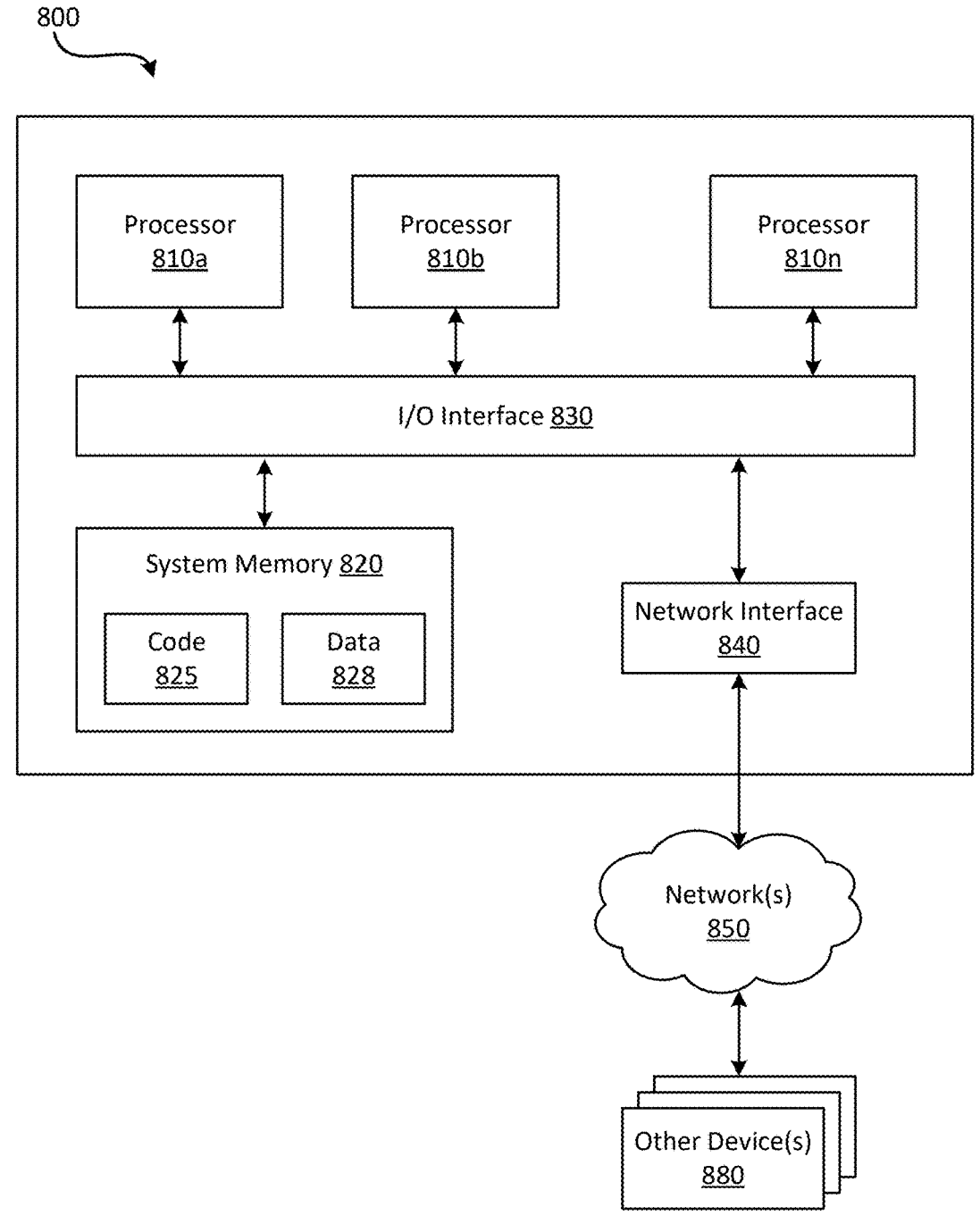
FIG. 8 is an example computing system in accordance with the present disclosure.

FIG. 8 illustrates a general-purpose computing device 800. In the illustrated embodiment, computing device 800 includes one or more processors 810*a*, 810*b*, and/or 810*n* (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 828.

In one embodiment, I/O interface 830 may be configured to coordinate I/O traffic between the processor 810, system memory 820 and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 880 attached to a network or network(s) 850, such as other computer systems or devices as illustrated in FIGS. 1 through 5, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for allocating workloads in a computing environment comprising a computing service provider and a plurality of edge computing networks, the edge computing networks comprising computing and storage devices configured to extend computing resources of the computing service provider to remote users of the computing service provider, the edge computing networks running network functions implementing communications services to the remote users, the method comprising:

receiving, from the edge computing networks, data indicative of network function allocations and capacity and usage of computing and network resources at the edge computing networks during a selected time interval;

using the data, running, by an orchestrator at the computing service provider, a predictive model to determine a predicted demand on the computing and network resources at edge computing networks at a future time interval, wherein the predicted demand comprises a time-based usage profile for the computing and network resources at the edge computing networks during the future time interval;

based on the predicted demand, determining a distribution of workloads at the edge computing networks, wherein:

the workloads pertain to the network functions implemented at the edge computing networks; and the distribution of workloads is determined based on criteria for optimizing an objective function; and causing, at the edge computing networks prior to the future time interval, numbers of instances of the network functions to be adjusted based on the distribution of workloads.

Clause 2: The method of clause 1, wherein the objective function optimizes one or more of cost, latency, throughput, or failure resilience.

Clause 3: The method of any of clauses 1-2, wherein the distribution of workloads comprises distribution of workloads between the edge computing networks and the computing service provider, between the edge computing networks, or a combination.

Clause 4: The method of any of clauses 1-3, wherein the edge computing networks further comprise a local edge manager configured to monitor the capacity and usage data for computing and network resources at the edge computing networks.

Clause 5: The method of any of clauses 1-4, wherein the objective function includes a constraint based on a policy associated with a user of the edge computing networks.

Clause 6: The method of any of clauses 1-5, wherein the predicted demand indicates a predicted decrease in usage, and wherein the adjusting comprises draining workloads at the edge computing networks.

Clause 7: The method of clauses 1-6, wherein the draining comprises sending new requests to selected instances of the network functions and allowing existing workloads to complete on a network function instance that is to be drained.

Clause 8: The method of any of clauses 1-7, wherein when the predicted demand exceeds available resources, a degraded service is provided based on a criterion.

Clause 9: The method of any of clauses 1-8, wherein the workloads comprise AI workloads or 5G workloads.

Clause 10: The method of any of clauses 1-9, wherein the network functions comprise service chaining.

Clause 11: The method of any of clauses 1-9, wherein the computing service provider is implemented as a multi-cloud environment.

Clause 12: A system comprising:

one or more processors; and a memory in communication with the one or more processors, the memory having computer-readable instructions stored thereupon that, when executed by the one or more processors, cause the system to perform operations comprising:

collecting data indicative of workload allocations and capacity/usage for computing and network resources at an edge computing network during a selected time interval;

applying a predictive function to the data to determine a predicted demand on the computing and network resources at a future time interval;

based on the predicted demand, determining a distribution of the workload allocations, wherein:

the predicted demand is a time-based usage profile for the computing and network resources during the future time interval;

the workload allocations pertain to functions implemented at the edge computing network; and the distribution of workload allocations is determined based on criteria for optimizing an objective function; and adjusting, at the edge computing network, the computing and network resources based on the predicted demand.

Clause 13: The system of clause 12, wherein the objective function comprises one or more of cost, latency, throughput, or failure resilience.

Clause 14: A computer-readable storage medium having computer-executable instructions stored thereupon which, when executed by one or more processors of a computing device, cause the computing device to:

collecting capacity and usage data for computing and network resources at an edge computing network, the edge computing network comprising computing and storage devices configured to extend computing resources of a computing service provider to remote users of the computing service provider;

sending the capacity and usage data to the computing service provider;

collecting data indicative of network function allocations and capacity/usage for computing and network resources at an edge computing network during a selected time interval;

applying a predictive function to the data to determine a predicted demand on the computing and network resources at a future time interval;

based on the predicted demand, determining a distribution of workloads, wherein:

the predicted demand is a time-based usage profile for the computing and network resources during the future time interval;

the workloads pertain to functions implemented at the edge computing network; and the distribution of workloads is determined based on criteria for optimizing cost and priorities; and adjusting, at the edge computing network, numbers of instances of the functions based on the predicted demand.

Clause 15: The computer-readable storage medium of clause 14, wherein the functions comprise service chaining.

Clause 16: The computer-readable storage medium of any of clauses 14 and 15, wherein the workloads comprise AI workloads or 5G workloads.

Clause 17: The computer-readable storage medium of any of the clauses 14-16, wherein when the predicted demand exceeds available resources, a degraded service is provided based on a criterion.

Clause 18: The computer-readable storage medium of any of the clauses 14-17, wherein the predictive function includes a cost function operable to determine an optimization of cost based on one or more constraints.

Clause 19: The computer-readable storage medium of any of the clauses 14-18, wherein the predicted demand indicates a predicted decrease in usage, and wherein the adjusting comprises draining workloads at the edge computing network.

Clause 20: The computer-readable storage medium of any of the clauses 14-19, wherein the draining comprises sending new requests to a different edge computing network and allowing existing workloads at the edge computing network to complete.

The invention claimed is:

1. A method for allocating workloads in a computing environment comprising a computing service provider and a plurality of edge computing networks, the edge computing networks comprising computing and storage devices configured to extend computing resources of the computing service provider to remote users of the computing service provider, the edge computing networks running network functions implementing communications services to the remote users, the method comprising:

receiving, from the edge computing networks, data indicative of network function allocations and capacity and usage of computing and network resources at the edge computing networks during a selected time interval;

using the data, running, by an orchestrator at the computing service provider, a predictive model to determine a predicted demand on the computing and network resources at edge computing networks at a future time interval, wherein the predicted demand comprises a time-based usage profile for the computing and network resources at the edge computing networks during the future time interval;

based on the predicted demand, determining a distribution of workloads at the edge computing networks, wherein:

the workloads pertain to the network functions implemented at the edge computing networks; and the distribution of workloads is determined based on criteria for optimizing an objective function; and causing, at the edge computing networks prior to the future time interval, numbers of instances of the network functions to be adjusted based on the distribution of workloads.

2. The method of claim 1, wherein the objective function optimizes one or more of cost, latency, throughput, or failure resilience.

3. The method of claim 1, wherein the distribution of workloads comprises distribution of workloads between the edge computing networks and the computing service provider, between the edge computing networks, or a combination.

4. The method of claim 1, wherein the edge computing networks further comprise a local edge manager configured to monitor the capacity and usage data for computing and network resources at the edge computing networks.

5. The method of claim 3, wherein the objective function includes a constraint based on a policy associated with a user of the edge computing networks.

6. The method of claim 1, wherein the predicted demand indicates a predicted decrease in usage, and wherein the adjusting comprises draining workloads at the edge computing networks.

7. The method of claim 6, wherein the draining comprises sending new requests to selected instances of the network functions and allowing existing workloads to complete on a network function instance that is to be drained.

8. The method of claim 1, wherein when the predicted demand exceeds available resources, a degraded service is provided based on a criterion.

9. The method of claim 1, wherein the workloads comprise AI workloads or 5G workloads.

10. The method of claim 1, wherein the network functions comprise service chaining.

11. The method of claim 1, wherein the computing service provider is implemented as a multi-cloud environment.

12. A system comprising:
one or more processors; and
a memory in communication with the one or more processors, the memory having computer-readable instructions stored thereupon that, when executed by the one or more processors, cause the system to perform operations comprising:
collecting data indicative of workload allocations and capacity/usage for computing and network resources at an edge computing network during a selected time interval;
applying a predictive function to the data to determine a predicted demand on the computing and network resources at a future time interval;
based on the predicted demand, determining a distribution of the workload allocations, wherein:
the predicted demand is a time-based usage profile for the computing and network resources during the future time interval;
the workload allocations pertain to functions implemented at the edge computing network; and
the distribution of workload allocations is determined based on criteria for optimizing an objective function; and
adjusting, at the edge computing network, the computing and network resources based on the predicted demand.

13. The system of claim 12, wherein the objective function comprises one or more of cost, latency, throughput, or failure resilience.

14. A non-transitory computer-readable storage medium having computer-executable instructions stored thereupon which, when executed by one or more processors of a computing device, cause the computing device to perform operations comprising:
collecting capacity and usage data for computing and network resources at an edge computing network, the edge computing network comprising computing and storage devices configured to extend computing resources of a computing service provider to remote users of the computing service provider;
sending the capacity and usage data to the computing service provider;
collecting data indicative of network function allocations and capacity/usage for computing and network resources at an edge computing network during a selected time interval;
applying a predictive function to the data to determine a predicted demand on the computing and network resources at a future time interval;
based on the predicted demand, determining a distribution of workloads, wherein:
the predicted demand is a time-based usage profile for the computing and network resources during the future time interval;
the workloads pertain to functions implemented at the edge computing network; and
the distribution of workloads is determined based on criteria for optimizing cost and priorities; and
adjusting, at the edge computing network, numbers of instances of the functions based on the predicted demand.

15. The non-transitory computer-readable storage medium of claim 14, wherein the functions comprise service chaining.

16. The non-transitory computer-readable storage medium of claim 14, wherein the workloads comprise AI workloads or 5G workloads.

17. The non-transitory computer-readable storage medium of claim 14, wherein when the predicted demand exceeds available resources, a degraded service is provided based on a criterion.

18. The non-transitory computer-readable storage medium of claim 14, wherein the predictive function includes a cost function operable to determine an optimization of cost based on one or more constraints.

19. The non-transitory computer-readable storage medium of claim 14, wherein the predicted demand indicates a predicted decrease in usage, and wherein the adjusting comprises draining workloads at the edge computing network.

20. The non-transitory computer-readable storage medium of claim 19, wherein the draining comprises sending new requests to a different edge computing network and allowing existing workloads at the edge computing network to complete.

* * * * *